United States Patent [19]

Millis, Jr.

[11] Patent Number: 4,873,685
[45] Date of Patent: Oct. 10, 1989

[54] SELF-CHECKING VOTING LOGIC FOR FAULT TOLERANT COMPUTING APPLICATIONS

[75] Inventor: Hugh L. Millis, Jr., Placentia, Calif.

[73] Assignee: Rockwell International Corporation, El Segundo, Calif.

[21] Appl. No.: 190,311

[22] Filed: May 4, 1988

[51] Int. Cl.$^4$ .............................................. G06F 11/00
[52] U.S. Cl. ........................................... 371/36; 371/3
[58] Field of Search ..................................... 371/3, 36

[56] References Cited

U.S. PATENT DOCUMENTS

| | | | |
|---|---|---|---|
| 3,784,978 | 1/1974 | Zola | 371/3 |
| 3,825,894 | 7/1974 | Johnson, Jr. | 371/3 |
| 3,891,969 | 6/1975 | Christensen | 371/3 |
| 4,468,768 | 8/1984 | Sunkle et al. | 371/3 |

OTHER PUBLICATIONS

Peritsky, Simple Digital Voting Circuit Detects a Unanimous Decision, Electronic Design 20, Sep. 27, 1978, vol. 26, p. 94.

Primary Examiner—Charles E. Atkinson
Attorney, Agent, or Firm—H. Fredrick Hamann; George A. Montanye; Tom Streeter

[57] ABSTRACT

An apparatus and method for providing self-checking voting logic for fault tolerant computing applications. The apparatus comprises a voting circuitry for producing a voting circuit output signal based upon a majority of triplicated logic output signals, unanimous circuitry for producing a unanimous circuit output signal that represents whether or not all of said triplicated logic output signal values are equal or not and self-checking circuitry for monitoring the validity of operation of the voting and the unanimous circuitry as well as said self-checking circuitry itself.

11 Claims, 2 Drawing Sheets

SELF-CHECKING VOTING LOGIC FOR FAULT TOLERANT COMPUTING APPLICATIONS

BACKGROUND OF THE INVENTION

1. Field of the Invention

The instant invention relates to a novel apparatus and method for significantly increasing the reliability of fault tolerant computing devices and related apparatus. More specifically, the invention relates to an apparatus and method for monitoring the valid operation of digital circuitry. The apparatus comprises conventional voting and unanimous circuitry and additional test circuitry, the latter functions to continually check itself, the voting circuitry and the unanimous circuitry for failures.

2. Description of the Related Art

In the field of fault tolerant computing, one of the most common techniques employed for enhancing the reliability of digital computation is to triplicate those circuits which provide critical logical functions. The application of triplicated circuit outputs through a voting circuit is most often used to determine the most common of the triplicated circuit's output values. This determination is typically accomplished by determining the most common, either two or three, of the output values and passing that value as the voting circuit's output. With related art voting schemes, any one of the three triplicated circuits can fail and correct voting circuit output values will still be produced. Additional circuitry is often used with the voting circuitry to determine if the voting is unanimous, i.e., whether all three binary inputs are the same, or whether only 2 out of 3 of the triplicated circuit outputs agree. This latter condition indicates that one of the triplicated circuits has failed. This condition is typically presented to any error control logic and/or software since it represents a potentially undetectable and fatal failure condition should either of the two remaining good circuits fail.

Heretofore, one basic limitation in the use of voting circuits and unanimous circuits for enhancing the reliability of critical digital circuitry is the inability of the test circuitry to determine whether the test circuit itself has failed. In other terms, related art circuitry which provides monitoring functions are susceptible to failure and such failures represent a significant reliability factor in the failure detection technique.

The above mentioned limitation relating to single voting and unanimous circuits also extends to paralleled sets of such circuits which are used for checking the individual bits of bytes or of words. Composite error signals may then be formed from the bits thus tested. Again, any of the individual voting and unanimous circuits, including the composite error signal circuitry, may fail and go undetected.

From the foregoing, the need should be appreciated for an extremely reliable self-checking device for use in fault tolerant computing applications and more particularly a device which continually checks voting circuitry, unanimous circuitry and itself for failures. Accordingly, a fuller understanding of the invention may be obtained by referring to the SUMMARY OF THE INVENTION, and the Detailed Description of the Preferred Embodiment, in addition to the scope of the invention as defined by the claims taken in conjunction of the accompanying drawings.

SUMMARY OF THE INVENTION

The invention is defined by the appended claims with a specific embodiment shown in the attached drawings. For the purposes of summarizing the invention, the invention comprises a self-checking logic device for monitoring voting circuit means and an unanimous circuit means each of which receive as inputs the outputs of triplicated circuits. The output state of the voting circuit means corresponds to a majority of the voting circuit means input logic values. The output state of the unanimous circuit means represents whether all of the triplicated circuits outputs agree or not.

In the preferred embodiment the self-checking circuitry includes an EXCLUSIVE OR function formed from the monitored triplicated digital circuit outputs and another EXCLUSIVE OR function formed from the outputs of the first EXCLUSIVE OR, the voting circuit, and the unanimous circuit. An output status bit is produced by this last exclusive "or" self-checking circuitry. The value of the output status bit remains at a single predetermined output logic value, representing proper operation, so long as the three circuits providing the checking circuit inputs are operating correctly. This output status value reverses, however, when any one of its input circuits fails and thereby produces an erroneous output.

In order to detect a failure in the self-checking circuitry itself, a test signal is periodically applied to the final self-checking test circuit. This test signal enables the self-checking circuitry to be periodically tested as a separate operation and thereby ensures the self-checking circuits valid operation.

The instant invention may also be extended to include a set of self-checking circuits, similar to the one just summarized. These sets of self-checking circuits are used to monitor the correct generation of each bit of a byte or word. In this version, the unanimous circuit outputs are "or'ed" together to give a single indication of circuit problems while the logic signals indicating failure from each bit are inputs to an EXCLUSIVE OR circuit to provide a final indication of a single bit failure in the word or byte being tested. A test signal is applied to this final EXCLUSIVE OR circuit to check the self-checking operation for the stuck at "no failure" condition in a manner similarly done for the final EXCLUSIVE OR circuit in each individual bit circuitry.

It is, accordingly, a principal object of the present invention to enhance the reliability of a critical logic function, by providing novel self-checking circuitry utilizing voting and unanimous circuits which determine the final output and status of conventional triplicated digital circuitry.

It is an advantage of the instant invention to enhance the output reliability of a critical logic function without disturbing the normal operation of the circuit.

It is a feature of the present invention is to provide novel self-checking digital circuitry for use with voting circuitry, the self-checking circuits normally being in one state so long as the voting circuitry is operating correctly; and to additionally provide input test provisions which check for a stuck at failure of the normal one state.

Another feature of the present invention is to provide replicated self-checking circuitry for use with individual voting and unanimous circuitry wherein each bit of a digital word and the self-checking circuitry itself is tested for operability.

The foregoing SUMMARY OF THE INVENTION outlines some of the more pertinent objects, features and advantages of the invention. These objects, features and advantages should be construed to be merely illustrative of some of the more prominent objects, features and advantages of the intended invention. Many other beneficial results can be obtained by applying the disclosed invention in a different manner or by modifying the invention within the scope of the disclosure. The summary outlines rather broadly the more pertinent and important features of the present invention in order that the Detailed Description of the Invention that follows may be better understood so that the present contribution to the art can be more fully appreciated.

Additional features of the invention will be described hereinafter which will form the subject of the claims of the invention. It should be appreciated by those skilled in the art that the conception of the specific embodiments disclosed may be readily utilized as a basis for modifying or developing other apparatus for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

Further objects, features and advantages of the present invention will become apparent as the following DESCRIPTION OF THE PREFERRED EMBODIMENT proceeds taken in conjunction with the accompanying drawings in which.

Figure 1:
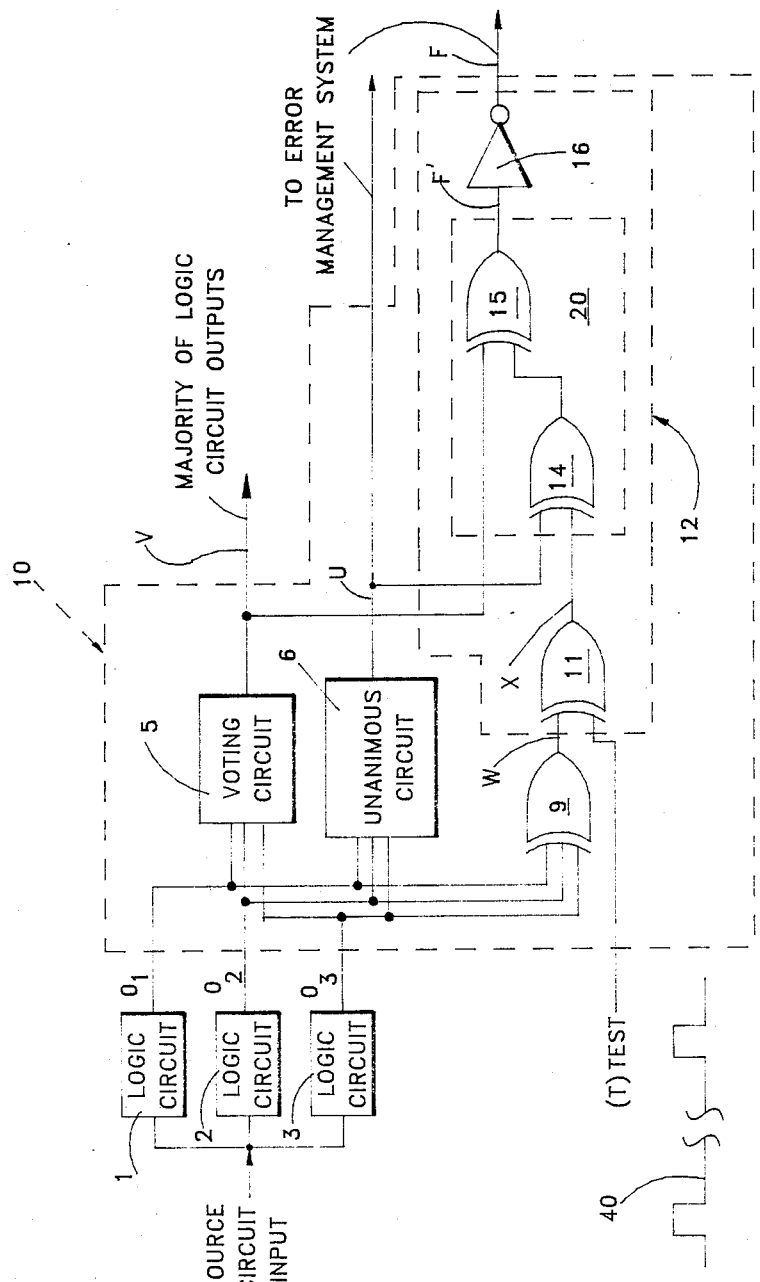
FIG. 1 is a partial block, partial schematic diagram of one form of the present invention illustrated in combination with voting and unanimous circuitry associated with triplicated circuits generating one bit of digital information.

Drawing reference numerals:
1: Triplicated digital logic circuit
2: Triplicated digital logic circuit
3: Triplicated digital logic circuit
5: Voting circuit
6: Unanimous circuit
9: Triple input EXCLUSIVE or circuit of 12
10: Self-checking voting logic
11: Two terminal EXCLUSIVE OR circuit of 12
12: Self-test circuitry of 10
14: EXCLUSIVE or circuit of 20
15: EXCLUSIVE or circuit of 20
16: Inverter of 12
20: Triple input EXCLUSIVE OR circuit of 12
30: n-Input OR gate
31: N+1 OR self-test circuit
32: Lowest level cascaded two terminal EXCLUSIVE OR circuit of 31
32n: Cascaded two terminal EXCLUSIVE OR circuits of 31
40: Test signal T waveform
42: Lowest order bit circuit of data word
44: Highest order bit circuit of data word

DESCRIPTION OF THE PREFERRED EMBODIMENT

Referring now to the drawings, and particularly to FIG. 1, there is shown a combination of circuits 5, 6, 9, and 12 comprising a preferred embodiment of the invention 10. FIG. 1 shows three identical, triplicated digital circuits 1, 2 and 3 which receive identical input logic signals from a source circuit, not specifically shown. The triplicated logic circuits 1, 2 and 3 each respectively produce signal outputs $O_1$, $O_2$, and $O_3$, which are applied as inputs to a voting circuit 5, a unanimous circuit 6 and a triple input EXCLUSIVE OR circuit 9. The voting circuit 5 is mechanized by the logical equation $V = O_1O_2 + O_1O_3 + O_2O_3$ and, the specific embodiment represented by this mechanization is well known in the art. According to the equation, the voting circuit 5 takes three input signal values and selects the majority value, either two out of three, or three out of three, of their values to obtain the voting circuit's 5 output signal V.

The unanimous circuit 6 determines whether or not all of the voting circuit 5 inputs agree or not. The unanimous circuit 6, accordingly, outputs a signal U equivalent to a high or a "1" when its inputs, (i.e., the triplicated distal circuit signal outputs $O_1, O_2$ and $O_3$) are identical (either all 1's or all 0's) or a low or "0" when only two of circuit 6's three inputs agree. The unanimous circuit's 6 operation and construction is also well known in the art and may be characterized by the following logical equation $U = O_1O_2O_3 + O'_1O'_2O'_3$.

As noted in the Background and Summary, a voting circuit such as indicated by reference numeral 5 in FIG. 1, can be used to provide enhanced reliability of critical logic functions in a computing system, or in other applications where fault tolerance is critical. More specifically, one of the triplicated digital circuits 1, 2 or 3 can fail and a correct output signal U will still be produced. The unanimous circuit 6 is typically used to signal an error management system (not shown) via its output signal V that one of the triplicated circuits 1, 2 or 3 has failed and that the monitored digital system is operating on a two out of three basis.

An external error management system may thus be warned that the potential exists for a total output failure upon the occurrence of another triplicated circuit failure. Maintenance, if available, might be called for. In any event, this information would form part of the system failure information needed for an overall error control strategy.

The function and purpose of the voting circuit 5 and unanimous circuitry 6 is, of course, negated if either fail and it is an object of the instant invention to provide additional circuitry which checks the operability of the voting 5 and the unanimous circuits 6 as well as the additional self-test circuitry 12 itself.

The additional self circuitry 12 preferably comprises a two terminal EXCLUSIVE OR circuit 11, a three input EXCLUSIVE OR circuit 20 which further includes a pair of EXCLUSIVE OR circuits 14 and 15, and an inverter 16.

Referring again to FIG. 1, it can be appreciated that the novel self-checking feature is accomplished by applying the three outputs $O_1$, $O_2$ and $O_3$ and a test signal T to the inputs of test circuit 12. The inputs respectively correspond to a three input EXCLUSIVE OR circuit 9 and to one terminal of a two input EXCLUSIVE OR circuit 11. The output W of the triple input EXCLU- SIVE circuit 9 is fed into the remaining input terminal of circuit 11. The respective outputs V and U of the voting 5, unanimous circuit 6 and the output signal X of EXCLUSIVE OR circuit 11 are applied as illustrated in FIG. 1 to a triple input EXCLUSIVE OR circuit 20 which is shown divided into a pair of EXCLUSIVE OR circuits 14 and 15. Signal W is characterized by the logical equation (01+02+03) while F′ is characterized by the logical equation (U+V+W). the F′ equation can be rewritten in terms of the equations for U, V and W as (010203+01′02′03′)+(0102+0103+0203)+(01+02+03). The output of circuit 15, F′, is inverted by an inverter 16 to form a signal F. This signal F corresponds to the output self-checked test signal.

A better understanding of the operation and function of the preferred embodiment may be achieved by referring to table 1 below:

TABLE 1

| | $O_1, O_2, O_3$, (ANY ORDER) | V | U | W | T | $\overline{F}$ | F |
|---|---|---|---|---|---|---|---|
| 1 | 000 | 0 | 1 | 0 | 0 | 1 | 0 |
| 2 | 001 | 0 | 0 | 1 | 0 | 1 | 0 |
| 3 | 011 | 1 | 0 | 0 | 0 | 1 | 0 |
| 4 | 111 | 1 | 1 | 1 | 0 | 1 | 0 |
| 5 | NO ERROR | | | | 1 | 0 | 1 |
| 6 | CIRCUIT ERROR | | | | 0 | 0 | 1 |

Table 1 defines the operation of the circuitry according to the present invention 10. The left hand column of Table 1 shows all possible combinations of $O_1$, $O_2$ and $O_3$, in no particular order, while the columns to its right show the V, U, and W outputs produced by their respective circuits based on the series of $O_1$, $O_2$, and $O_3$ inputs. As can be appreciated from an examination of the table, when the input test signal T is off, or "0", the output signal F′ will be "1" for all four of the first 4 rows of the truth table and its complement, F, denoting failure, will be "0". However, if an error occurs in any of circuits 5, 6 or 9, its output value, represented generally on row 6 of Table 1, will be reversed from the normal output value expected. In other words, the output failure signal F will change to a "1" thereby, indicating an error condition.

The operation just described only represents one portion of the present invention. The only circuit left untested by the described technique is the final test circuitry 12. This circuit 12 has two basic hard failure modes, namely, stuck at off or "0" mode or stuck at on or "1" mode. A stuck "on" condition represents an obvious and immediately detectable failure condition, as indicated by Table 1, supra. However, a stuck at "off" condition is normally undetectable because its expected normal state will be "0" (i.e., no circuit error, and circuit 12 will thus be unable to respond to circuit errors).

This potential problem is overcome by testing for the possible stuck at "0" condition by momentarily activating the test signal T and observing the output failure signal F. An acceptable signal T for this purpose is indicated by the waveform 40 as shown in FIG. 1. If circuit 12 is operating properly, signal F will go to a "1" while a stuck at "0" condition will result in the circuit 12 output remaining at "0".

Accordingly, the error management portion of a digital circuit (not shown) incorporating this invention 10 can periodically test the operability of the output gating circuitry 12 by raising the test signal T to a "1", and thereby determine whether or not the output failure signal F did indeed change to a "1". Otherwise, as stated previously, a stuck at "0" condition is indicated by virtue of signal F remaining at "0". A stuck at "0" condition indicates that the voting 5 and unanimous circuit 6 operations may or may not be valid. It will be appreciated that this test operation, using signal T, is conducted separately and independently from the voting circuit's 5 and unanimous circuit's 6 operation and hence does not interfere with the normal monitored digital circuits 1, 2, or 3's operation.

The circuitry depicted in FIG. 1 deals with voting where a single, key logic function, such as write select, chip select, interrupt, etc. signals are generated. In other applications, voting may be extended to include bytes, words, or the like. In these cases, a modified version of the voting 5 and unanimous circuit 6 testing is required where the resulting output values are abstracted from all of the bits being tested.

Figure 2:
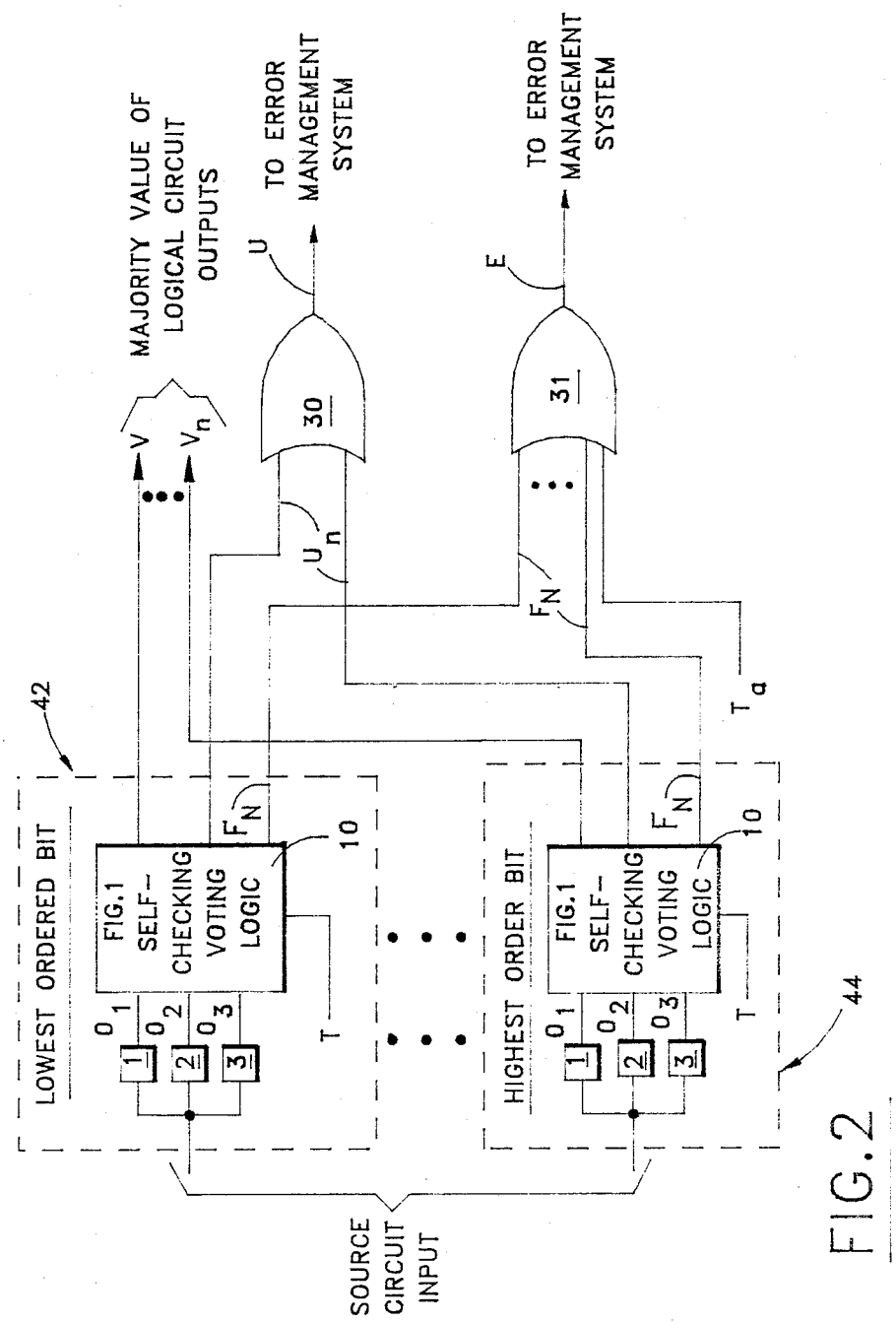
FIG. 2 is a partial block, partial schematic diagram illustrating another use of the present invention, in combination with voting and unanimous circuitry associated with each bit in a digital word.

FIG. 2 illustrates such an application of the instant invention wherein the invention 10 (as shown in FIG. 1) is replicated for each bit in a word. This replication is shown starting with the lowest ordered bit, represented in FIG. 2 by reference numeral 42, through the highest ordered bit, as indicated, by reference numeral 44. The outputs $O_1$, $O_2$ and $O_3$ from each respective set of triplicated circuits 1, 2, and 3 are applied to the replicated self-checking voting logic circuits 10. The output V through Vn representing the voting results of the various self-checking voting logic circuits 10 are taken as the final output bit values as shown in FIG. 2.

The $U_N$ signals from the series of replicated self-checking voting logic circuits 10 are applied to a respective series of input terminals of a n-Input OR gate 30 whose output is available for monitoring by an error management system (not shown). An $U_N$ output signal of "1" denotes that one or more of the triplicated circuits 1, 2 or 3's output lines $O_1$, $O_2$ or $O_3$ associated with any of the triplicated circuits 1, 2 or 3 has failed.

The Fn signals from the series of self-checking voting logic circuits 10 are applied to the respective first n input terminals of a n+1 input "OR" gate 31 whose output signal E is monitored by the error management system (not shown).

The operation of the test signal T and Ta of the FIG. 2 circuitry is best described in connection with Table 2 below: t,0160

With both test signals T and Ta off, (Table 2, lines 1 and 2), an E output of "0" signifies no apparent circuit 10 failure, although circuit 31 itself or one of the logic unit 10s' output test circuits 12 could be stuck at "0". This condition tested for as indicated in Table 2, lines 3 to 6. The line 2 case of E=1 indicates at least one circuit 10 failure. Lines 3 and 4 represent the self-test results of T=1. An E=0 signal, line 3, indicates the presence of either a circuit 10 or a circuit 31 failure. On the other hand, the line 4 condition of E=1 indicates operability of all circuits. Lines 5 and 6 of Table 2, illustrate the isolation of the line 3 failure condition to either circuit 31 or to one or more of the circuit 10s. The test condition, shown in Table 2, line 5, where Ta=1 and T=0, resulting in an E output of "0" indicates a circuit 31 failure while line 6 shows E=1 signifying that circuit 31 is operable with the line 3 condition being caused by one or more circuit 10 failures.

The present disclosure includes that contained in the appended claims, as well as that of the foregoing specification. Although this invention has been described in its preferred form with a certain degree of particularity., it is understood that the present disclosure of the preferred form has been made only by way of example and that numerous changes in the details of construction and the combination and arrangement of parts may be resorted to without departing from the spirit and scope of the invention.

More particularly, it will be appreciated by those skilled in the art that the specific embodiments shown and described herein represent specific logical implementations of the present invention which may be widely varied in detail based on standard logic design practices without involving invention. For example, either complemented or uncomplemented output test signals, unanimous signals, etc., may be employed, and in practice the logic may include "nand", "nor" and EXCLUSIVE NOR logic gates for mechanization. None of these changes would change the scope or function of the present invention.

Now that the invention has been described, what is claimed is:

1. An apparatus comprising in combination:
   a voting circuit means for producing a voting circuit output signal based upon a majority value of triplicated logic output signals 01, 02, and 03;
   a unanimous circuit means for producing a unanimous circuit output signal representing whether or not all of said triplicated logic output signal values are equal or not; and
   a self-checking means for monitoring operational validity of said voting and said unanimous circuit means, and said self-checking means, said self-checking, voting, and unanimous circuit means operating independently from triplicated logic circuits producing said triplicated logic output signals, and said self-checking circuit means receiving said output signals 01, 02, and 03, said voting circuit output signal, and said unanimous circuit output signal.

2. The apparatus as set forth in claim 1, wherein said voting circuit means comprises:
   an electrical circuit that produces said voting circuit output value mechanized by a logical equation wherein said voting circuit output value=0102+0103+0203.

3. The apparatus as set forth in claim 1, wherein said unanimous circuit means comprises:
   an electrical circuit that produces said unanimous circuit output value mechanized by the following logical equation wherein said unanimous circuit output value=01 02 03+01' 02' 03'.

4. The apparatus as set forth in claim 1, wherein said self-checking means comprises,
   an electrical circuit that produces an operational validity signal value mechanized by the following logical equation wherein said operational validity signal=logic signal T$\oplus$(0102+0103+0203)$\oplus$(010203+01'02'03')$\oplus$(01$\oplus$02$\oplus$03).

5. The apparatus as set forth in claim 1, wherein said self-checking means comprises:
   a triple input EXCLUSIVE OR circuit having an output wherein said inputs of said triple input EXCLUSIVE OR circuit are connected to said triplicated logic output signals;
   a two input, single output EXCLUSIVE OR circuit whose inputs are respectively connected to said triple input EXCLUSIVE OR circuit output and to a logic signal T; and
   said single output of said two input, single output EXCLUSIVE OR circuit being connected in conjunction with said unanimous circuit output signal, and with said voting circuit output signal to a second triple input EXCLUSIVE OR circuit wherein said second triple input EXCLUSIVE OR circuit produces an output representing results of said self-checking means.

6. The apparatus as set forth in claim 4 wherein said logical signal T is toggled between a logic "0" state and a logic "1" state to test for correct operability of said self-checking means, said toggling operating independently from monitored triplicated logic circuits.

7. An apparatus comprising, in combination:
   a series of voting circuit means each respectively receiving a series of triplicated logic output signals 01, 02, 03, wherein each of said voting circuit means produces an output signal V corresponding to a majority of values of said triplicated logic output signals received from associated triplicated logic circuitry;
   a series of unanimous circuit means for receiving said series of triplicated logic output signals, wherein each of said unanimous circuit means produces an output signal U representing whether or not its received triplicated logic outut signals agree or not;
   a series of self-checking circuit means for detecting failures in said series of voting circuit means, said series of unanimous circuit means, and in said self-checking circuit means, wherein each respective self-checking circuit means of said series of self-checking circuit means functions independently from associated triplicated logic circuitry to produce an error signal F based upon said detection, and wherein each respective self-checking circuit means receives said output signals 01, 02, and 03 from said associated triplicated logic circuitry, said output signal V from a voting circuit means, and said output signal U from a unanimous circuit means; and
   a multiple input self-checking circuit means for "OR"-'ing said F error signals in conjunction with a self-test logic signal $T_a$.

8. The apparatus as set forth in claim 7, wherein said series of voting circuit means comprises:
   multiple electrical circuits which each individually produce said output signal V mechanized by the following logical equation wherein each said signal V=0102+0103+0203.

9. The apparatus as set forth in claim 7, wherein said series of unanimous circuit means comprises:
   electrical circuits which produce said series of output signals U wherein each said output signal U=01 02 03+01' 02' 03'.

10. The apparatus as set forth in claim 7 wherein said logical signal $T_a$, is toggled between a logic "0" and a logic "1" state to self-test said multiple input self-checking circuit means, said toggling and said multiple self-checking circuit means operating independently from associated triplicated logic circuitry. .

11. The apparatus as set forth in claim 8 wherein said multiple self-checking circuit comprises a multiple input OR gate.

* * * * *